US012644706B2

(12) United States Patent
Jiang et al.

(10) Patent No.: US 12,644,706 B2
(45) Date of Patent: Jun. 2, 2026

(54) METHOD FOR JOINT ESTIMATION OF STELLAR ATMOSPHERIC REFRACTION AND STAR TRACKER ATTITUDE

(71) Applicant: BEIJING UNIVERSITY OF AERONAUTICS AND ASTRONAUTICS, Beijing (CN)

(72) Inventors: Jie Jiang, Beijing (CN); Jisan Yang, Beijing (CN); Lingfeng Tian, Beijing (CN); Guangjun Zhang, Beijing (CN)

(73) Assignee: BEIJING UNIVERSITY OF AERONAUTICS AND ASTRONAUTICS, Beijing (CN)

( * ) Notice: Subject to any disclaimer, the term of this patent is extended or adjusted under 35 U.S.C. 154(b) by 375 days.

(21) Appl. No.: 18/190,164

(22) Filed: Mar. 27, 2023

(65) Prior Publication Data

US 2023/0243655 A1    Aug. 3, 2023

Related U.S. Application Data

(63) Continuation of application No. PCT/CN2021/118406, filed on Sep. 15, 2021.

(30) Foreign Application Priority Data

Jul. 9, 2021    (CN) .......................... 202110778625.0

(51) Int. Cl.
*G01C 21/02* (2006.01)

(52) U.S. Cl.
CPC ................................. *G01C 21/025* (2013.01)

(58) Field of Classification Search
CPC .................................................. G01C 21/025

(Continued)

(56) References Cited

U.S. PATENT DOCUMENTS 11,635,481 B2 * 4/2023 Jiang ..................... G01S 3/7867
702/92
2024/0230341 A1 * 7/2024 Belenkii .............. G01C 21/025

* cited by examiner

*Primary Examiner* — Aditya S Bhat
(74) *Attorney, Agent, or Firm* — Muncy, Geissler, Olds & Lowe, P.C.

(57) ABSTRACT

Disclosed is a method for joint estimation of stellar atmospheric refraction and star tracker attitude, including: capturing, by a star tracker, an image of stars, and recognizing the image to obtain a matching relationship between an observed star and a reference star; transforming the reference star to a terrestrial reference frame based on time and position of observation to obtain a true zenith distance of the reference star; calculating an estimated stellar atmospheric refraction based on a simplified atmospheric refraction model, the true zenith distance, and an initial atmospheric refractive coefficient, and subjecting the reference star to stellar atmospheric refraction compensation; calculating the star tracker attitude, and re-projecting the observed star to the terrestrial reference frame to calculate the observed stellar atmospheric refraction and the stellar atmospheric refraction error; if the observed stellar atmospheric refraction is misaligned with the estimated stellar atmospheric refraction, adjusting the atmospheric refractive coefficient based on the stellar atmospheric refraction error, and then recompensating the reference star and calculating the attitude, till the observed stellar atmospheric refraction is aligned with the estimated stellar atmospheric refraction, whereby joint estimation results of the stellar atmospheric refraction and the star tracker attitude are obtained. The disclosure realizes real-time, autonomous estimation and cancelation of stellar atmospheric refraction without being limited by external sensors or empirical formulae.

8 Claims, 3 Drawing Sheets

(58) Field of Classification Search
USPC ........................................................... 702/92
See application file for complete search history.

1

METHOD FOR JOINT ESTIMATION OF STELLAR ATMOSPHERIC REFRACTION AND STAR TRACKER ATTITUDE

CROSS REFERENCE

The present disclosure claims priority to Chinese Patent Application No. 202110778625.0, titled "METHOD FOR JOINT ESTIMATION OF STELLAR ATMOSPHERIC REFRACTION AND STAR TRACKER ATTITUDE" and filed on Jul. 9, 2021, the entire contents of which are incorporated herein by reference

TECHNICAL FIELD

Embodiments of the present disclosure relate to star tracker technologies, and more particularly relate to a method for joint estimation of stellar atmospheric refraction and star tracker attitude.

BACKGROUND

A star tracker refers to an embedded sensing device which acquires a spatial three-axis attitude with fixed stars as a reference frame through phases including obtaining an image of stars, locating centroids of the stars, recognizing and tracking the stars in the image, and determining the attitude. As a currently highest-precision instrument for attitude measurement, the star tracker has been widely applied in various types of spacecrafts. Star trackers used in near-earth spacecrafts, e.g., rocket-borne, airborne, and ship-borne star trackers, are collectively referred to as terrestrial star trackers. To realize high-precision three-axis attitude measurement, such star trackers need to overcome measurement error issues caused by starlight atmospheric refraction (stellar atmospheric refraction SAR).

The common SAR correction methods at present mainly adopt an empirical formula. According to this method, the stellar zenith distance (apparent zenith distance/true zenith distance) and the meteorological parameters (ambient temperature, atmospheric pressure, and relative humidity, etc.) at the observation site are substituted into an empirical SAR multinomial expansion, whereby the empirical SAR value is calculated. Correcting the stellar zenith distance with the empirical SAR may mitigate the three-axis attitude measurement error to some extent. However, this method relies on atmospheric parameter sensors, such as thermometers, hygrometers, and barometers, and is affected by sensor errors and empirical formula errors. An empirical SAR formula in terms of apparent zenith distance also relies on the a priori attitude of the star tracker, which further degrades the SAR estimation accuracy.

In addition, some SAR estimation methods leveraging the invariants in the starlight atmospheric refraction have also been proposed. For example, the zenithal direction may be first estimated based on the characteristic that the azimuth is invariant before and after starlight atmospheric refraction, and then the stellar atmospheric refraction is estimated. There has been further proposed a method which estimates the atmospheric refractive coefficient by constructing a Kalman filtering equation according to the principle of inter-star angular distance invariability. However, none of such methods can satisfy the real-time and optimality requirements simultaneously, such that they can hardly be put into practical use.

SUMMARY

An objective of the present disclosure is to provide a method for estimating star tracker attitude based on optimized atmospheric refractive coefficient feedback which satisfies both real-time and optimality requirements, so as to overcome drawbacks of conventional methods for stellar atmospheric refraction correction. The method enables optimization of atmospheric refractive coefficient feedback while obtaining optimal star tracker attitude by constructing an atmospheric refractive coefficient feedback mechanism based on a simplified starlight atmospheric refraction model, a star image recognition result, a celestial reference frame transformation chain, characteristics QUEST algorithm for attitude determination, and a relationship between stellar atmospheric refraction and optimal attitude.

A technical solution of the present disclosure is provided as follows:

The present disclosure provides a method for joint estimation of stellar atmospheric refraction and star tracker attitude, comprising:

Step S100: capturing, by a star tracker, an image of stars, and recognizing the image to obtain a matching relationship between an observed star and a reference star;

Step S200: transforming the reference star to a terrestrial reference frame based on time and position of observation to obtain a true zenith distance of the reference star;

Step S300: obtaining a stellar atmospheric refraction compensated reference stellar vector in the terrestrial reference frame;

Step S400: obtaining an attitude cosine matrix from a star tracker coordinate system to the terrestrial reference frame;

Step S500: obtaining a stellar atmospheric refraction error based on the attitude cosine matrix;

Step S600: subjecting the stellar atmospheric refraction error to linear least squares fitting to obtain a fit slope and a fit intercept, wherein if the absolute value of the fit slope is greater than a cutoff condition, an estimated atmospheric refractive coefficient is superimposed with a feedback gain that is positively correlated to the fit slope, and the method returns to step S300; if the absolute value of the fit slope is smaller than the cutoff condition, iteration ends, whereby an optimal atmospheric refractive coefficient and an atmospheric refraction error compensated star tracker attitude are obtained.

Furthermore, in step S100, the star tracker obtains an image of the stars to acquire coordinates of the stars on an imaging plane, whereby all observed stellar vectors in the star tracker coordinate system are obtained, and then performs image recognition to obtain the matching relationship between the observed star and the reference star on a navigational star catalogue.

Furthermore, in step S200, the reference star obtained from step S100 is transformed from a celestial reference frame adopted in the navigational star catalogue to the terrestrial reference frame at the position of observation of the star tracker to obtain a reference stellar vector free of stellar atmospheric refraction in the terrestrial reference frame, whereby a true zenith distance of the reference star is further obtained.

Furthermore, in step S300, an estimated stellar atmospheric refraction is calculated based on a simplified atmospheric refraction model, the true zenith distance, and an initial atmospheric refractive coefficient, and the reference star is subjected to stellar atmospheric refraction compensation, whereby a stellar atmospheric refraction compensated reference stellar vector in the terrestrial reference frame is obtained.

Furthermore, in step S400, an attitude quaternion from the star tracker coordinate system to the terrestrial reference frame is calculated by substituting the observed stellar vector in the star tracker coordinate system and the stellar atmospheric refraction compensated reference stellar vector in a QUEST algorithm, whereby the attitude cosine matrix from the star tracker coordinate system to the terrestrial coordinate system is further obtained.

Furthermore, the subjecting the reference star to stellar atmospheric refraction compensation refers to subtracting the corresponding estimated stellar atmospheric refraction from the true zenith distance of the reference star to obtain a new reference stellar vector.

Furthermore, in step S500, the observed stellar vector in the star tracker coordinate system is transformed to the terrestrial coordinate system via the attitude cosine matrix and compared with the reference star in the terrestrial coordinate system to calculate a magnitude of an observed stellar atmospheric refraction, and then a difference between the observed stellar atmospheric refraction and the estimated atmospheric refraction is found, whereby the stellar atmospheric refraction error is obtained.

Furthermore, in step S600, the stellar atmospheric refraction error is subjected to linear least squares fitting to obtain a fit slope and a fit intercept.

Compared with conventional technologies, the present disclosure offers the following beneficial effects:

(1) The disclosure realizes real-time, autonomous estimation of the atmospheric refractive coefficient without reliance on additional external sensors, such as thermometers, barometers, hygrometers, and attitude sensors, eliminates the noises from sensor and empirical model errors, and reduces the difficulty and system overheads of a terrestrial star tracker in cancelling the stellar atmospheric refraction.

(2) The present disclosure realizes an optimization mechanism for atmospheric refractive coefficient feedback, which, compared with conventional stellar atmospheric refraction estimation methods, can satisfy both of rea-time and optimization requirements and thus offers a high practicality.

(3) The method according to the present disclosure eliminates the atmospheric refraction-induced star tracker attitude measurement errors. The method constructs an atmospheric refractive coefficient feedback mechanism using a simplified starlight atmospheric refraction model based on the star image recognition algorithm and the celestial reference frame transformation chain in consideration of the characteristics of QUEST algorithm for attitude determination and the relationship between stellar atmospheric refraction and optimal attitude. The atmospheric refractive coefficient feedback mechanism enables real-time, optimal estimation of the atmospheric refractive coefficient while obtaining the terrestrial star tracker attitude free of stellar atmospheric refraction noise.

4

Figure 4:
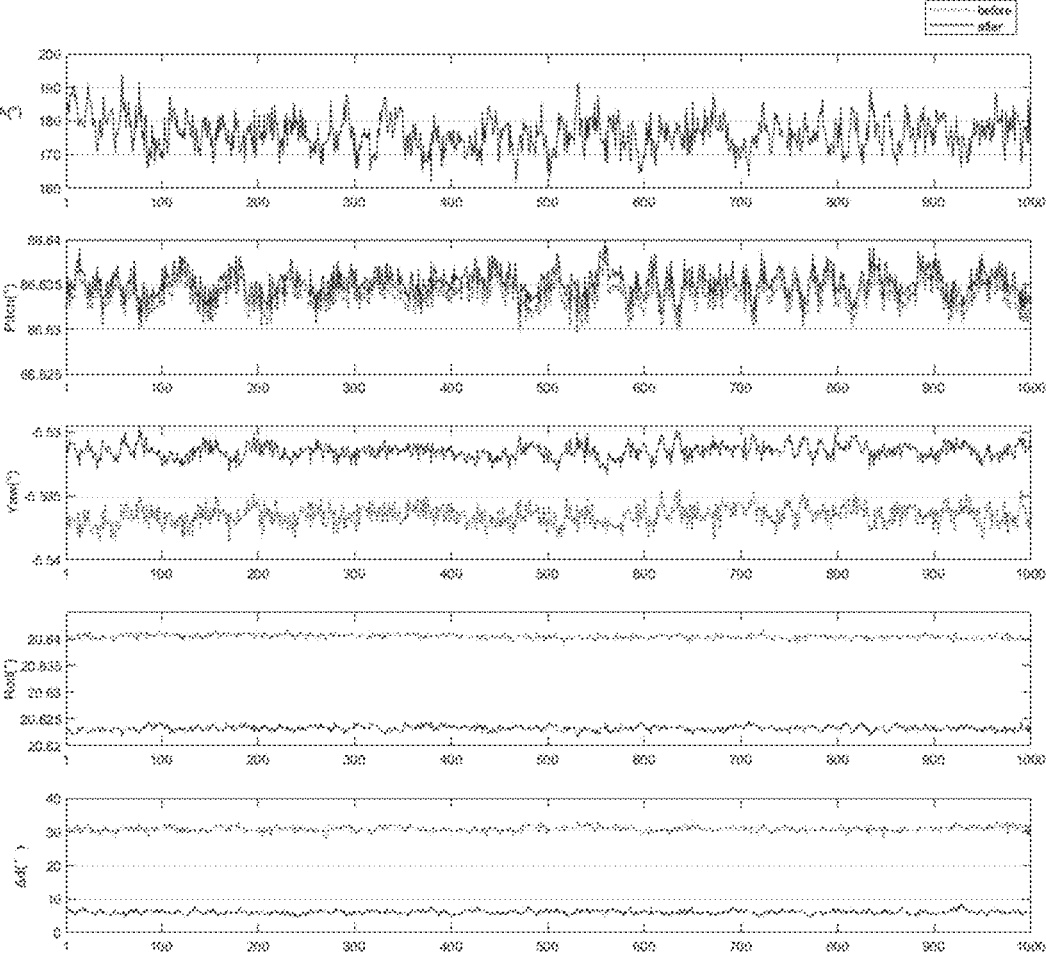
Figure 5:
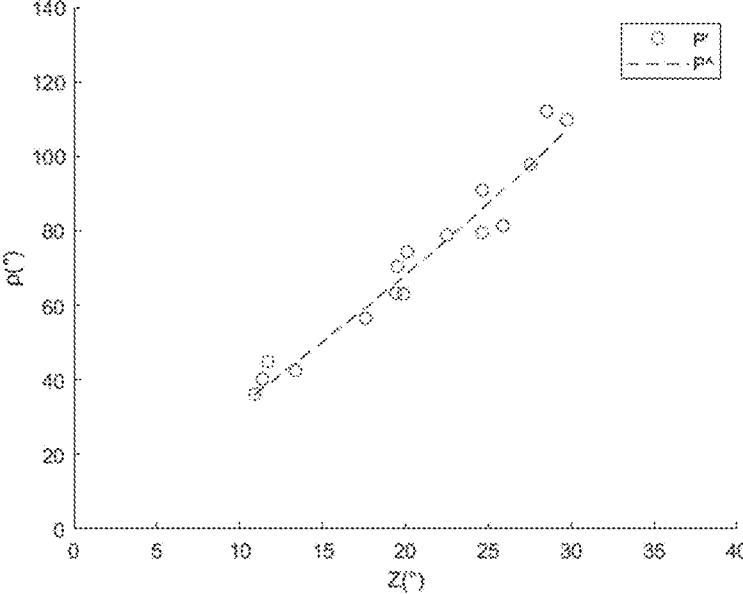

FIG. 4 is a diagram of test measurements of 1000 continuous frames of star images captured by the star tracker at a turntable tilt angle of 20° according to the present disclosure;

FIG. 5 is an effect diagram of stellar atmospheric refraction estimation for single-frame measurement at a turntable tilt angle of 20° according to the present disclosure.

DETAILED DESCRIPTION

To make the objectives, technical solutions, and advantages of the present disclosure more apparent, the present disclosure will be described in further detail through specific implementations with reference to the drawings. It should be understood that the depictions are only exemplary, not intended for limiting the scope of the present disclosure. In addition, depictions about known structures and technologies is omitted in the description below so as to avoid unnecessary confusion to the concepts of the present disclosure.

The present disclosure provides a method for joint estimation of stellar atmospheric refraction and star tracker attitude, specifically comprising:

step S100: capturing, by a star tracker, an image of stars, and recognizing the image to obtain a matching relationship between an observed star and a reference star.

Specifically, the star tracker captures an image of stars to acquire coordinates of the stars on the imaging plane to obtain all observed stellar vectors in the star tracker coordinate system, and then performs star image recognition to obtain a matching relationship between the observed star and the reference star on a navigational stellar catalogue.

Specifically, all observed stellar vectors in the star tracker coordinate system are obtained based on internal parameters of the star tracker, a distortion model, and a camera imaging model.

Specifically, the star tracker captures an image of the observed star to obtain a series of observed vectors $W_s$ in the star tracker coordinate system, where $W_s=[W_{s,1}, W_{s,2}, W_{s,3}, \ldots, W_{s,n}]$.

The star image may be recognized using algorithms such as a subgraph isomorphism algorithm (e.g., triangulation algorithm, pyramid algorithm, etc.), a pattern recognition algorithm (e.g., grid algorithm, recognition algorithm based on the radial companion-circumferential feature, etc.); and other types of recognition algorithms (e.g., neural network-based star image recognition algorithm) are also allowed. The star image recognition algorithm is not unique, and an appropriate algorithm is selected dependent on actual conditions. Irrespective of which algorithm is selected, it needs to ensure correctness of the recognition result. The information about the reference star includes right ascension, declination, proper motion, parallax, and radial velocity.

Specifically, the star tracker captures an image of observed stars to acquire coordinates [X, Y] of the stars on the imaging plane, where $=[X_1, X_2, X_3, \ldots, X_n]^T$, $Y=[Y_1, Y_2, Y_3, \ldots, Y_n]^T$. the observed star vectors $W_s=[w_{s,1}, w_{s,2}, w_{s,3}, \ldots, w_{s,n}]$ in the star tracker coordinate system are obtained based on a lens distortion model, a camera imaging model, and internal parameters of the star tracker (e.g., principle point $X_0, Y_0$, focal length f, distortion parameters $p_1, p_2, q_1, q_2$, and pixel sizes $d_x, d_y$), where:

$$w_{s,i} = \frac{1}{\sqrt{\hat{x}_i^2 + \hat{y}_i^2 + f^2}} \begin{bmatrix} -\hat{x}_i \\ -\hat{y}_i \\ f \end{bmatrix} \tag{1}$$

-continued where:

$$\hat{x}_i = x_i(1 + q_1 r^2 + q_2 r^4) + 2p_1 x_i y_i + p_2(r^2 + 2x_i^2) \tag{2}$$

$$\hat{y}_i = y_i(1 + q_1 r^2 + q_2 r^4) + p_1(r^2 + 2y_i^2) + 2p_2 x_i y_i$$

$$x_i = (X_i - X_0)dx$$

$$y_i = (Y_i - Y_0)dy$$

$$r = \sqrt{x_i^2 + y_i^2}$$

Then, the reference stars $V_r=[v_{r,1}, v_{r,2}, v_{r,3}, \ldots, v_{r,n}]$ matched with the observed stars on the stellar catalogue are obtained by performing star image recognition using modified triangular algorithm, where $v_{r,i}=[RA_i, DE_i, pmRA_i, pmDE_i, Plx_i, rv_i]^T$, where $RA_i$ denotes the right ascension, $DE_i$ denotes the declination, $pmEA_i$ denotes the longitude component of proper motion, $pmDE_i$ denotes the latitude component of the proper motion, $PLx_i$ denotes the parallax, and $rv_i$ denotes the radial velocity.

Step 200: transforming the reference star to a terrestrial reference frame based on time and position of observation to obtain a true zenith distance of the reference star.

Specifically, the reference star obtained from step S100 is transformed from the celestial reference system adopted by the navigational stellar catalogue to the terrestrial reference frame at the observation position of star tracker, obtaining reference stellar vectors free of stellar atmospheric refraction in the terrestrial reference frame, whereby the true zenith distance of the reference star is obtained.

Specifically, the reference star obtained from step S100 is transformed from the celestial reference system adopted by the navigational stellar catalogue to the terrestrial reference frame at the observation position of the star tracker using a high-precision celestial reference system transformation chain based on the imaging time and position of the star tracker and the Earth's rotation information.

Specifically, in transformation of the reference star's coordinate system, the star tracker imaging time refers to the exposure center time, which may be represented by UTC time on the scale of milliseconds; and the position refers to the longitude, latitude, and altitude of the star tracker at the exposure center time, which may be represented by a WGS84 ellipsoid reference coordinate system, precise to a scale of seconds and meters.

Specifically, the Earth's rotation information includes the Earth's polar wander and DUT 1 of the day, which may be provided by IERS (International Earth Rotation Service). To perform reference star coordinate system transformation based on the high-precision coordinate system transformation chain provided by SOFA (Standards Of Fundamental Astronomy), it further requires acquisition of parameters such as the right ascension, declination, proper motion, parallax, and radial velocity of the reference star on the navigation stellar catalogue.

Specifically, the observation site's terrestrial reference frame refers to the East-North-Up celestial reference system, wherein the following in the terrestrial reference frame are obtained: reference vector: $V_g=[v_{g,1}, v_{g,2}, v_{g,3}, \ldots, v_{g,n}]$, zenith vector $U=[0,0,1]^T$, true zenith distance $Z=[Z_1, Z_2, Z_3, \ldots, Z_n]^T$, where:

$$Z_i=\arccos(U \cdot v_{g,i}) \tag{3}$$

Specifically, the UTC time T for the star tracker exposure center time, the longitude-latitude-altitude coordinates P (WGS84 elliptic reference coordinate system) where the star tracker is located, the Earth's pole wander Pm=[px, py] and dut1 of the day are obtained, among which pm and dut1 may be provided by EIRS (https://iers.org). Then, by transforming the reference star from the celestial reference system adopted by the navigational stellar catalogue to the terrestrial reference frame of the star tracker's observation site using the high-precision coordinate system transformation chain provided by IAU SOFA (http://www.iausofa.org/), the reference vector $V_g=[v_{g,1}, v_{g,2}, v_{g,3}, \ldots, v_{g,n}]$ in the terrestrial reference frame is given as such:

$$V_g=iauCST(V_r,T,P,Pm,dut1) \tag{4}$$

where iau(*) denotes using the iauSOFA function to transform the reference stellar coordinate from the celestial reference system to the terrestrial reference frame, Vr denotes the coordinate in the reference stellar celestial reference system, T denotes the observation time, P denotes the observation position, Pm denotes the Earth's pole wander of the day, and dut1 denotes the difference constant between UT1 time and UTC time.

Given the zenith vector $U=[0,0,1]^T$, the true zenith distances $Z=[Z_1, Z_2, Z_3, \ldots, Z_n]^T$ of all reference stars are calculated according to the equation below:

$$Z_i=\arccos(U \cdot v_{g,i}) \tag{5}$$

Step S300: obtaining a stellar atmospheric refraction compensated reference stellar vector in the terrestrial reference frame.

Figure 1:
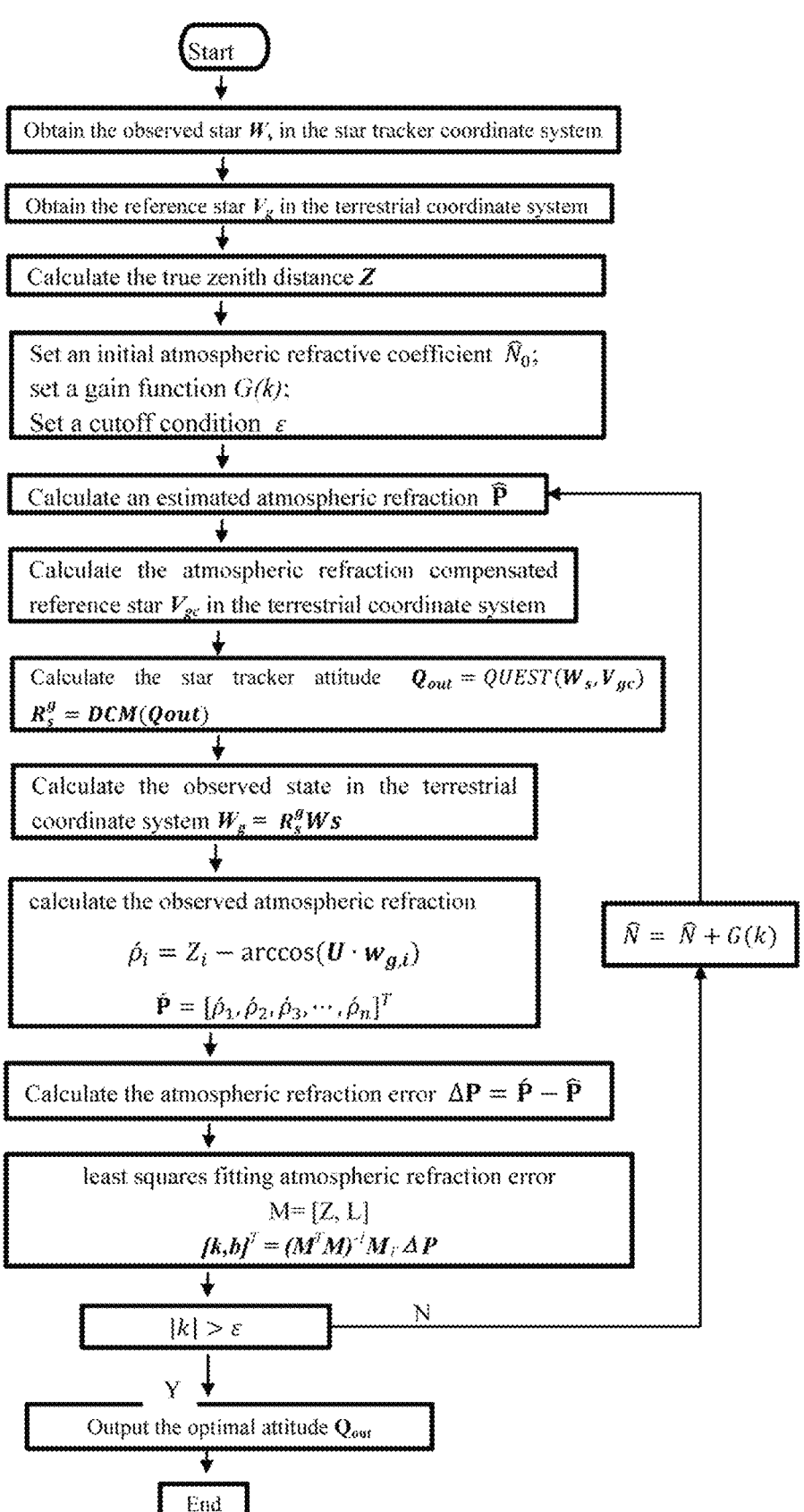
FIG. 1 is a flow diagram of a method for joint estimation of stellar atmospheric refraction and star tracker attitude according to the present disclosure.
Figure 2:
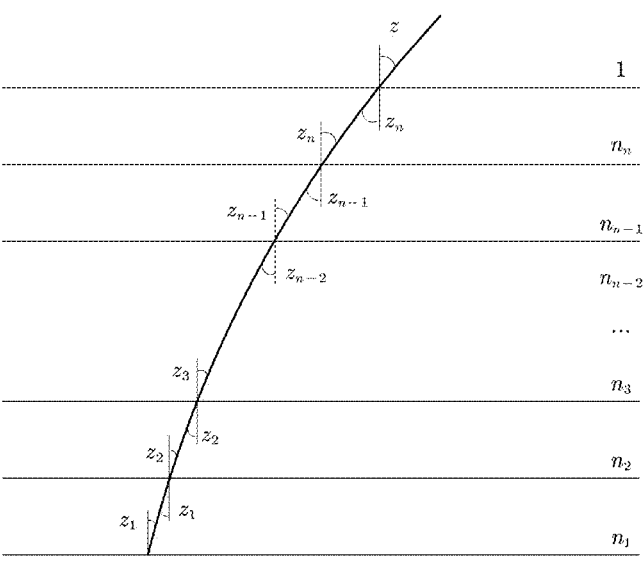
FIG. 2 is a diagram of a simplified starlight atmospheric refraction model according to the present disclosure.
Figure 3:
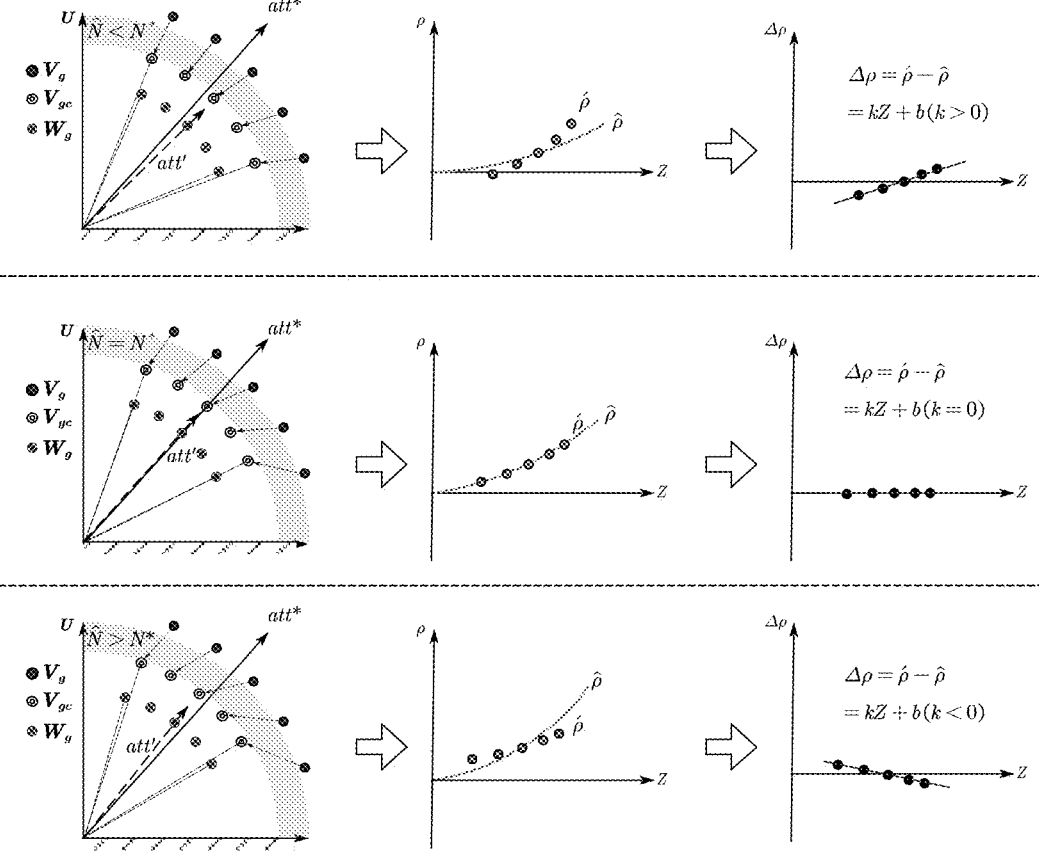
FIG. 3 is a schematic diagram of an atmospheric refractive coefficient feedback mechanism according to the present disclosure.

Specifically, a stellar atmospheric refraction calculation formula is obtained based on a simplified starlight atmospheric refraction model, as shown in FIG. 2. The estimated atmospheric refractions of all reference stars are calculated by substituting the estimated atmospheric refractive coefficient and the true zenith distances of all reference stars into the atmospheric refraction calculation formula, and the reference stellar vectors are subjected to stellar atmospheric refraction correction along the elevation angle incremental direction, whereby the stellar atmospheric refraction compensated reference stellar vectors in the terrestrial reference frame are obtained.

Specifically, the simplified starlight atmospheric refraction model refers to regarding the Earth's atmosphere as being comprised of innumerable concentric spheres, where the atmospheric density and the refractive index increase as the altitude decreases, and the atmosphere in the field of view (FOV) of the star tracker may be regarded as comprising 1~n planar layers from the observation site to the interstellar space irrespective of the curvature of the atmospheric sphere, the incident angle of the starlight outside the atmosphere is referred to as the true zenith distance Z; refraction occurs when the starlight propagates from one layer to the next layer, and the starlight curves convexly toward the vertical normal to the observation site. Supposing the atmospheric refractive index at the outermost layer is $n_n$, the following is given by the refraction law:

$$\sin(Z)=n_n \sin(Z_n) \tag{6}$$

where $Z_n$ stands for the true zenith distance of the stellar vector at the outermost layer of atmosphere, and the adjacent next layer is given as follows:

$$n_n \sin(Z_n)=n_{n-1} \sin(Z_{n-1}) \tag{7}$$

Till the lowest layer which is given as follows:

$$n_2 \sin(Z_2)=n_1 \sin(Z_1) \tag{8}$$

The above equations can be combined into the following:

$$\sin(Z)=n_1 \sin(Z_1) \tag{9}$$

where $Z_1$ stands for the true zenith distance when the stellar vector is propagated to the lowest layer; from the perspective of the observation site, it is the apparent zenith distance, represented by $Z'$, where $Z' < Z$. The stellar atmospheric refraction $\rho$ is defined as a difference between the true zenith distance $Z$ and the apparent zenith distance $Z'$:

$$\rho = Z - Z' \tag{10}$$

so, the equation (9) may be rewritten as follows:

$$\sin(Z) = n_1 \sin(Z-\rho) = n_1 \sin(Z)\cos(\rho) - n_1 \cos(Z)\sin(\rho) \tag{11}$$

since $\rho$ is very small, taking $\cos(\eta)=1$, $\sin(\rho)=\rho$, then the atmospheric refraction $\rho$ is given as follows:

$$\rho = \frac{n_1 - 1}{n_1} \tan(Z) = N\tan(Z) \tag{12}$$

where $N$ denotes the atmospheric refractive coefficient, which is on the scale of arc-second. When $N_1$ takes the standard atmospheric refractive index 1.000292, $N0=60.21''$. The initial value of the atmospheric refractive coefficient $\hat{N}$ may be set to standard atmospheric coefficient $\hat{N}_0=60.21$. According to the stellar atmospheric refraction calculation equation (12), the estimated stellar atmospheric refractive coefficient $\hat{N}$ and the true zenith distances $Z$ of all reference stars may be substituted to calculate the estimated atmospheric refractions $\hat{P}=[\hat{\rho}_1, \hat{\rho}_2, \hat{\rho}_3, \ldots, \hat{\rho}_n]^T$ of all reference stellar vectors, where:

$$\hat{\rho}_i = \hat{N} \tan(Z_i) \tag{13}$$

Then, the reference stellar vectors are subjected to stellar atmospheric refraction correction along the elevation angle incremental direction, obtaining the stellar atmospheric refraction compensated reference stellar vector $V_{gc}=[v_{gc,1}, v_{gc,2}, v_{gc,3}, \ldots, v_{gc,n}]$ in the terrestrial reference frame, where:

$$v_{gc,i} = [\cos \hat{\rho}_i I + (1-\cos \hat{\rho}_i)n_i n_i^T + \sin \hat{\rho}_i n_i^{\wedge}]v_{g,i} \tag{14}$$

where $I$ denotes the unit matrix, $n_i$ denotes the rotation vector when the reference stellar vector $v_{g,i}$ increments by elevation angle $\hat{\rho}_i$:

$$n_i = v_{g,i} \times U \tag{15}$$

$n_i^{\wedge}$ denotes the antisymmetric matrix composed of vector elements, and $n_i(1)$, $n_i(2)$, and $n_i(3)$ represent the $1^{st}$, $2^{nd}$, and $3^{rd}$ elements of the vector $n_i$:

$$n_i^{\wedge} = \begin{bmatrix} 0 & -n_i(3) & n_i(2) \\ n_i(3) & 0 & -n_i(1) \\ -n_i(2) & n_i(1) & 0 \end{bmatrix} \tag{16}$$

Step S400: obtaining an attitude cosine matrix from the star tracker coordinate system to the terrestrial reference frame.

Specifically, the observed stellar vector in the star tracker coordinate system and the atmospheric refraction compensated reference stellar vector in the terrestrial reference frame are substituted into a QUEST algorithm to calculate an attitude quaternion from the star tracker coordinate system to the terrestrial reference frame, whereby the attitude cosine matrix from the star tracker coordinate system to the terrestrial reference frame is obtained.

Specifically, the observed stellar vector in the star tracker coordinate system and the stellar atmospheric refraction compensated reference stellar vector in the terrestrial reference frame are substituted into the QUEST algorithm to calculate the attitude quaternion from the star tracker coordinate system to the terrestrial reference frame, where the attitude quaternion is given as follows:

$$Q_{out} = \text{QUEST}(W_s, V_{gc}) \tag{17}$$

where QUEST(*) stands for the QUEST algorithm, $W_s$ denotes the observed stellar vector in the star tracker coordinate system, and $V_{gc}$ refers to the stellar atmospheric refraction compensated reference stellar vector in the terrestrial reference frame;

in the equation, $Q_{out}=[v, q_4]$, where $v$ denotes the imaginary part of the quaternion, $v=[q_1, q_2, q_3]$, $q_1$, $q_2$, $q_3$ being elements of the imaginary part of the quaternion, and $q_4$ denotes the real part of the quaternion; then the star tracker attitude cosine matrix is given as follows:

$$R_s^g = \begin{bmatrix} 1-2(q_2^2+q_3^2) & 2(q_1q_2+q_3q_4) & 2(q_1q_3-q_2q_4) \\ 2(q_1q_2-q_3q_4) & 1-2(q_1^2+q_3^2) & 2(q_2q_3+q_1q_4) \\ 2(q_1q_3+q_2q_4) & 2(q_2q_3-q_1q_4) & 1-2(q_1^2+q_2^2) \end{bmatrix} \tag{18}$$

Step S500: obtaining a stellar atmospheric refraction error based on the attitude cosine matrix;

Specifically, the observed stellar vector in the star tracker coordinate system is transformed to the terrestrial reference frame via the attitude cosine matrix and compared with the reference star in the terrestrial reference frame to calculate the magnitude of the observed stellar atmospheric refraction; and then a difference between the observed stellar atmospheric refraction and the estimated stellar atmospheric refraction is solved, whereby the stellar atmospheric refraction error is obtained.

Specifically, the observed stellar vector in the star tracker coordinate system is transformed to the terrestrial reference frame, obtaining $W_g=[w_{g,1}, w_{g,2}, w_{g,3}, \ldots, w_{g,n}]$:

$$W_g = R_s^g W_s \tag{19}$$

Then, the $W_g$ is compared with the reference star in the terrestrial reference frame to calculate the magnitude of the stellar atmospheric refraction $\acute{P}=[\acute{\rho}_1, \acute{\rho}_2, \acute{\rho}_3, \ldots, \acute{\rho}_n]^T$, where:

$$\acute{\rho}_i = Z_i - \arccos(U \cdot w_{g,i}) \tag{20}$$

And then, a difference between the observed stellar atmospheric refraction and the estimated stellar atmospheric refraction is found to obtain the stellar atmospheric refraction error as follows:

$$\Delta P = \acute{P} - \hat{P} \tag{21}$$

Step S600: subjecting the stellar atmospheric refraction error to linear least squares fitting to obtain a fit slope and a fit intercept; if the absolute value of the fit slope is greater than the cutoff condition, the estimated atmospheric refractive coefficient is superimposed with a feedback gain, the feedback gain being positively correlated to the fit slope, and then the process returns to step S300; if the absolute value of the fit slope is less than the cutoff condition, the iteration is terminated, whereby the optimal atmospheric refractive coefficient and the atmospheric refraction error compensated star tracker attitude are obtained.

Specifically, the stellar atmospheric refraction error is subjected to linear least squares fitting based on the atmospheric refractive coefficient feedback mechanism to obtain the fit slope and the fit intercept.

The atmospheric refractive coefficient feedback mechanism goes like this: according to the characteristics of the simplified starlight atmospheric refraction model and the QUEST algorithm least squares, when $\hat{N}<N^*(N^*$ is the true value): the elevation angle of the stellar atmospheric refraction compensated reference star is smaller than the true position, with the elevation angle distribution range being greater than that of the observed star, such that the reference star is misaligned with the observed star; after attitude determination by QUEST, the boresight pointing is lower than the true pointing, which indicates an erroneous estimated attitude; however, since the stellar atmospheric refraction error is proportional to the zenith distance and the slope is greater than 0, the more $\hat{N}$ deviates from $N^*$, the greater the slope of the atmospheric refraction; when $\hat{N}=N^*$: the elevation angle of the stellar atmospheric refraction compensated reference star is equal to the true position, indicating that the elevation angle distribution range is aligned the observed star; after attitude determination by QUEST, the boresight pointing is aligned with the true pointing, indicating that there is no error in attitude estimation; the stellar atmospheric refraction error is 0, and the slope is 0; when $\hat{N}>N^*$: the elevation angle of the stellar atmospheric refraction compensated reference star is greater than the true position, the elevation angle distribution range is smaller than that of the observed star, indicating that the reference star is misaligned with the observed star; after attitude determining by QUEST, the boresight pointing is higher than the true pointing, indicating that the attitude estimation has an error; however, since the stellar atmospheric refraction error is inversely proportional to the zenith distance and the slope is less than 0, the more $N$ deviates from $N^*$, the smaller the slope of the stellar atmospheric refraction error. Thus, the atmospheric refractive coefficient feedback mechanism is constructed, and the stellar atmospheric refraction error linear parameter is fitted using the least squares:

$$[k,b]^T=(M^TM)^{-1}M^T\Delta P \qquad (22)$$

where $M=[Z, L]$, $L=[1, 1, 1, \ldots, 1]_{1\times n}^T$. If $|k|>\varepsilon$ (where $\varepsilon$ denotes the termination condition, close to 0), it indicates that $\hat{N}$ does not reach the optimal and needs to be updated; then gain $G(k)$ is superimposed to $\hat{N}$, and the process returns to step S300, where $G(k)$ and $k$ are positively correlated; to achieve rapid convergence of $\hat{N}$, a PID gain may be adopted:

$$a\ \hat{N} = \hat{N} + G(k) = \hat{N} + g_p k_i + g_I \sum_{i=1}^{n} k_i + g_D(k_i - k_{i-1}) \qquad (23)$$

where gP, gI, and gD are the proportional, integral, and derivative coefficients, respectively; $_{ki}$ is the slope of current stellar atmospheric refraction error, $k_{i-1}$ is the previous value. If $|k|<\varepsilon$, it may be believed that $\hat{N}$ reaches the optimal; now, the optimal atmospheric refractive coefficient is obtained, and the atmospheric refraction error compensated star tracker attitude is also obtained.

IMPLEMENTATION EFFECT

To verify the effectiveness of the method for estimation of star tracker attitude provided by the present disclosure, a star observation field experiment was conducted. Before the experiment, the star tracker was mounted on a turntable, where the initial tilt angle of the turntable was 0°, and the installation plane normal pointed approximately towards the zenithal direction; the turntable was turned 6 times, about 5° for each turn; after the turntable became stable, data acquisition started, where seven groups of continuous star images were acquired in total, each including 1000 frames. The method provided by the present disclosure was adopted for attitude estimation, and the mean angular distance error (reprojection error, ARE) between the observed vector projection and the reference vector in the terrestrial reference frame was adopted as the evaluation criterion:

$$\Delta d = \frac{1}{b}\sum_{i=1} \arccos(w_{g,i} \cdot v_{g,i}) \qquad (24)$$

$$\Delta D = \frac{1}{B}\sum_{j=1}^{B}\Delta d_j \qquad (25)$$

b represents the number of all observed stars in one frame of star image; and B represents the total number of star images.

Results of comparison between attitude measurements before and after correction are shown in Table 1, which sets forth the attitude estimation effects of respective groups when the turntable tilt angle was at 0°, 5°, . . . , 30°. FIG. 4 shows the comparison results of 1000 test frames when the turntable tilt angle was at 20°, and FIG. 5 shows the stellar atmospheric refraction estimations of one frame thereof; Table 2 shows an iteration process of single-frame measurement in terms of atmospheric refractive coefficient of the star tracker when the turntable tilt angle was at 20°.

TABLE 1

| Turntable tilt angle (°) | Attitude Euler angle (°) | | ARE (") | | Standard deviation of ARE (") | |
|---|---|---|---|---|---|---|
| | Before correction | After correction | Before correction | After correction | Before correction | After correction |
| 0 | 86.6256 | 86.6258 | 22.7287 | 4.6154 | 1.3695 | 0.8484 |
| | −5.4339 | −5.4324 | | | | |
| | 0.7364 | 0.7348 | | | | |
| 5 | 86.6239 | 86.6243 | 28.0878 | 4.7634 | 1.4643 | 0.7284 |
| | −5.4609 | −5.4578 | | | | |
| | 5.7518 | 5.7458 | | | | |
| 10 | 86.6326 | 86.6331 | 27.5967 | 5.7002 | 1.5795 | 0.704 |
| | −5.4846 | −5.4803 | | | | |
| | 10.6949 | 10.6861 | | | | |
| 15 | 86.6322 | 86.6325 | 27.7093 | 5.0529 | 1.3457 | 0.6372 |
| | −5.5128 | −5.5087 | | | | |
| | 15.856 | 15.8421 | | | | |

TABLE 1-continued

| Turntable | Attitude Euler angle (°) | | ARE (") | | Standard deviation of ARE (") | |
| tilt angle (°) | Before correction | After correction | Before correction | After correction | Before correction | After correction |
|---|---|---|---|---|---|---|
| 20 | 86.6338 | 86.6351 | 30.8921 | 6.0615 | 0.7465 | 0.5925 |
|  | −5.5365 | −5.5314 |  |  |  |  |
|  | 20.6404 | 20.6232 |  |  |  |  |
| 25 | 86.6309 | 86.635 | 31.113 | 6.6874 | 1.1355 | 0.7698 |
|  | −5.563 | −5.556 |  |  |  |  |
|  | 25.7288 | 25.705 |  |  |  |  |
| 30 | 86.6261 | 86.6307 | 28.5306 | 6.3751 | 1.0973 | 0.5871 |
|  | −5.5854 | −5.5815 |  |  |  |  |
|  | 30.7538 | 30.7239 |  |  |  |  |

TABLE 2

| i | Â | k | b |
|---|---|---|---|
| 1 | 60.21 | 2.405 | −44.6921 |
| 2 | 180.4603 | 0.12823 | −1.7799 |
| 3 | 186.8719 | 0.0068465 | 0.50786 |
| 4 | 187.2142 | 0.00036557 | 0.63001 |
| 5 | 187.2325 | 1.952e−05 | 0.63653 |

In view of the above, the present disclosure provides a method for joint estimation of stellar atmospheric refraction and star tracker attitude, comprising: capturing, by a star tracker, an image of stars, recognizing the image to obtain a matching relationship between an observed star and a reference star; transforming the reference star to a terrestrial reference frame based on time and position of observation to obtain a true zenith distance of the reference star; calculating an estimated stellar atmospheric refraction using a simplified stellar atmospheric refraction model, the true zenith distance, and an initial stellar atmospheric refractive coefficient; subjecting the reference star to stellar atmospheric refraction compensation for the reference star; calculating the star tracker attitude, re-projecting the observed star to the terrestrial reference frame, and calculating an error between the observed stellar atmospheric refraction and the estimated stellar atmospheric refraction; adjusting the atmospheric refractive coefficient based on the stellar atmospheric refraction error if the observed stellar atmospheric refraction is misaligned with the estimated stellar atmospheric refraction, so as to re-compensate the reference star and calculate the attitude till the observed stellar atmospheric refraction is aligned with the estimated stellar atmospheric refraction, whereby results of the joint estimation of the stellar atmospheric refraction and the star tracker attitude are obtained. The disclosure realizes real-time, autonomous estimation and elimination of star tracker atmospheric refraction, avoids the limitations of empirical formulas, eliminates the reliance on additional sensors, such as thermometers, barometers, hygrometers, and attitude sensors, and reduces the difficulty and system overheads of a terrestrial star tracker in cancelling the atmospheric refraction; the present disclosure adopts a simplified starlight atmospheric refraction model to construct an atmospheric refractive coefficient feedback mechanism based on the star image recognition algorithm and the celestial reference system transformation chain in consideration of the characteristics of QUEST algorithm for attitude determination and the relationship between stellar atmospheric refraction and optimal attitude. The atmospheric refractive coefficient feedback mechanism enables real-time, optimal estimation of the atmospheric refractive coefficient while obtaining the terrestrial star tracker attitude free of stellar atmospheric refraction noise.

It is understood that the specific implementations described above are only for illustrating or explaining the principle of the disclosure through examples, not intended for constituting limitation to the disclosure. Accordingly, any modification, equivalent substitution, and improvement without departing from the spirits and scope of the disclosure falls into the scope sought for protection in the disclosure. In addition, the appended claims intend to cover the scope and boundary of the claims or all variations and modifications within equivalents of the scope and boundary.

What is claimed is:

1. A method for joint estimation of stellar atmospheric refraction and star tracker attitude, executed by a star tracker processor in a spacecraft navigation system to enhance attitude determination accuracy, comprising:

capturing, by a star tracker, an image of stars, acquiring coordinates of the stars on an imaging plane to obtain all observed stellar vectors in the star tracker coordinate system, and recognizing the image to obtain a matching relationship between an observed star and a reference star;

transforming the reference star to a terrestrial reference frame based on time and position of observation by converting the reference star from a celestial reference frame adopted in a navigational star catalog to the terrestrial reference frame at the star tracker's observation position to obtain a true zenith distance of the reference star;

obtaining a stellar atmospheric refraction compensated reference stellar vector in the terrestrial reference frame by calculating an estimated stellar atmospheric refraction using a simplified atmospheric refraction model with the true zenith distance and an initial atmospheric refractive coefficient, then subtracting said estimated refraction from the true zenith distance;

obtaining an attitude cosine matrix from a star tracker coordinate system to the terrestrial reference frame by inputting the observed stellar vectors and compensated reference stellar vectors into a QUEST algorithm to generate an attitude quaternion, which is converted to the attitude cosine matrix;

obtaining a stellar atmospheric refraction error based on the attitude cosine matrix by transforming observed stellar vectors to the terrestrial reference frame via the matrix, comparing with reference vectors to calculate observed refraction, then finding the difference between observed and estimated refraction;

subjecting the stellar atmospheric refraction error to linear least squares fitting to obtain a fit slope and a fit intercept, wherein if the absolute value of the fit slope is greater than a cutoff condition, an estimated atmospheric refractive coefficient is superimposed with a feedback gain that is positively correlated to the fit slope, and the method returns to obtaining a stellar atmospheric refraction compensated reference stellar vector in the terrestrial reference frame;

if the absolute value of the fit slope is smaller than the cutoff condition, iteration ends, whereby an optimal atmospheric refractive coefficient and an atmospheric refraction error compensated star tracker attitude are obtained for real-time spacecraft orientation adjustment.

2. The method of claim 1, wherein the capturing, by a star tracker, an image of stars, and recognizing the image to obtain a matching relationship between an observed star and a reference star comprises: obtaining, by the star tracker, the image of the stars to acquire coordinates of the stars on an imaging plane, whereby all observed stellar vectors in the star tracker coordinate system are obtained; and performing image recognition to obtain the matching relationship between the observed star and the reference star on a navigational star catalogue.

3. The method of claim 2, wherein the transforming the reference star to a terrestrial reference frame based on time and position of observation to obtain a true zenith distance of the reference star comprises: transforming the reference star from a celestial reference frame adopted in the navigational star catalogue to the terrestrial reference frame at the position of observation of the star tracker to obtain a reference stellar vector free of stellar atmospheric refraction in the terrestrial reference frame, whereby a true zenith distance of the reference star is further obtained.

4. The method of claim 3, wherein the obtaining a stellar atmospheric refraction compensated reference stellar vector in the terrestrial reference frame comprises: calculating an estimated stellar atmospheric refraction based on a simplified atmospheric refraction model, the true zenith distance, and an initial atmospheric refractive coefficient, and subjecting the reference star to stellar atmospheric refraction compensation, whereby a stellar atmospheric refraction compensated reference stellar vector in the terrestrial reference frame is obtained.

5. The method of claim 4, wherein the obtaining an attitude cosine matrix from a star tracker coordinate system to the terrestrial reference frame comprises: calculating an attitude quaternion from the star tracker coordinate system to the terrestrial reference frame by substituting the observed stellar vector in the star tracker coordinate system and the stellar atmospheric refraction compensated reference stellar vector in a QUEST algorithm, whereby the attitude cosine matrix from the star tracker coordinate system to the terrestrial coordinate system is further obtained.

6. The method of claim 4, wherein the subjecting the reference star to stellar atmospheric refraction compensation refers to subtracting corresponding estimated stellar atmospheric refraction from the true zenith distance of the reference star to obtain a new reference stellar vector.

7. The method of claim 5, wherein the obtaining a stellar atmospheric refraction error based on the attitude cosine matrix comprises: transforming the observed stellar vector in the star tracker coordinate system to the terrestrial coordinate system via the attitude cosine matrix, comparing the observed stellar vector with the reference star in the terrestrial coordinate system to calculate a magnitude of an observed stellar atmospheric refraction, and finding a difference between the observed stellar atmospheric refraction and the estimated stellar atmospheric refraction, whereby the stellar atmospheric refraction error is obtained.

8. The method of claim 7, wherein the stellar atmospheric refraction error is subjected to linear least squares fitting to obtain a fit slope and a fit intercept.

* * * * *